Sept. 23, 1952            J. PILIERO            2,611,138
MATTRESS AND UPHOLSTERY SPRING STRUCTURE
Filed Feb. 3, 1950            2 SHEETS—SHEET 1
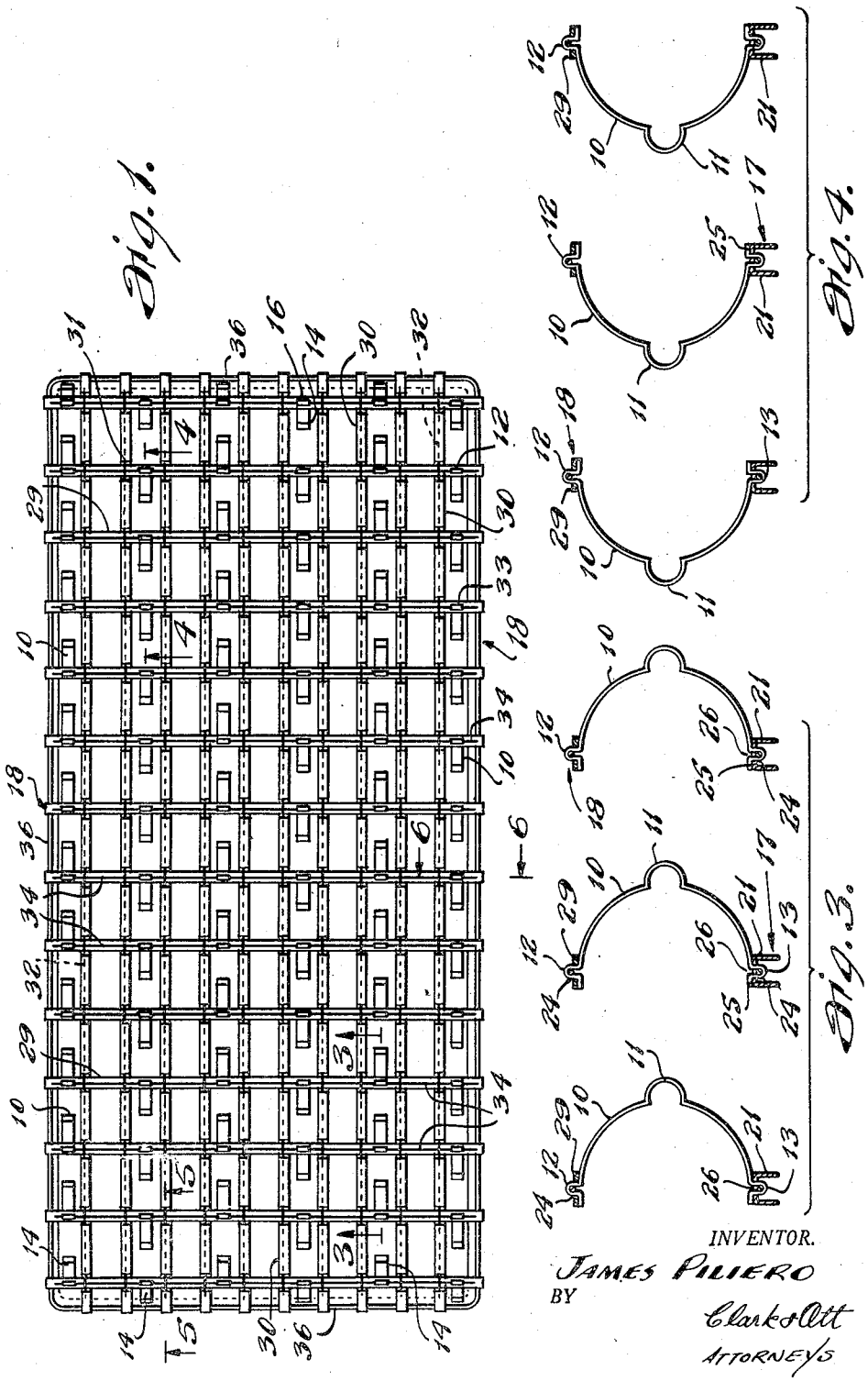
INVENTOR.
JAMES PILIERO
BY
Clark & Ott
ATTORNEYS Sept. 23, 1952 J. PILIERO 2,611,138
MATTRESS AND UPHOLSTERY SPRING STRUCTURE
Filed Feb. 3, 1950 2 SHEETS—SHEET 2
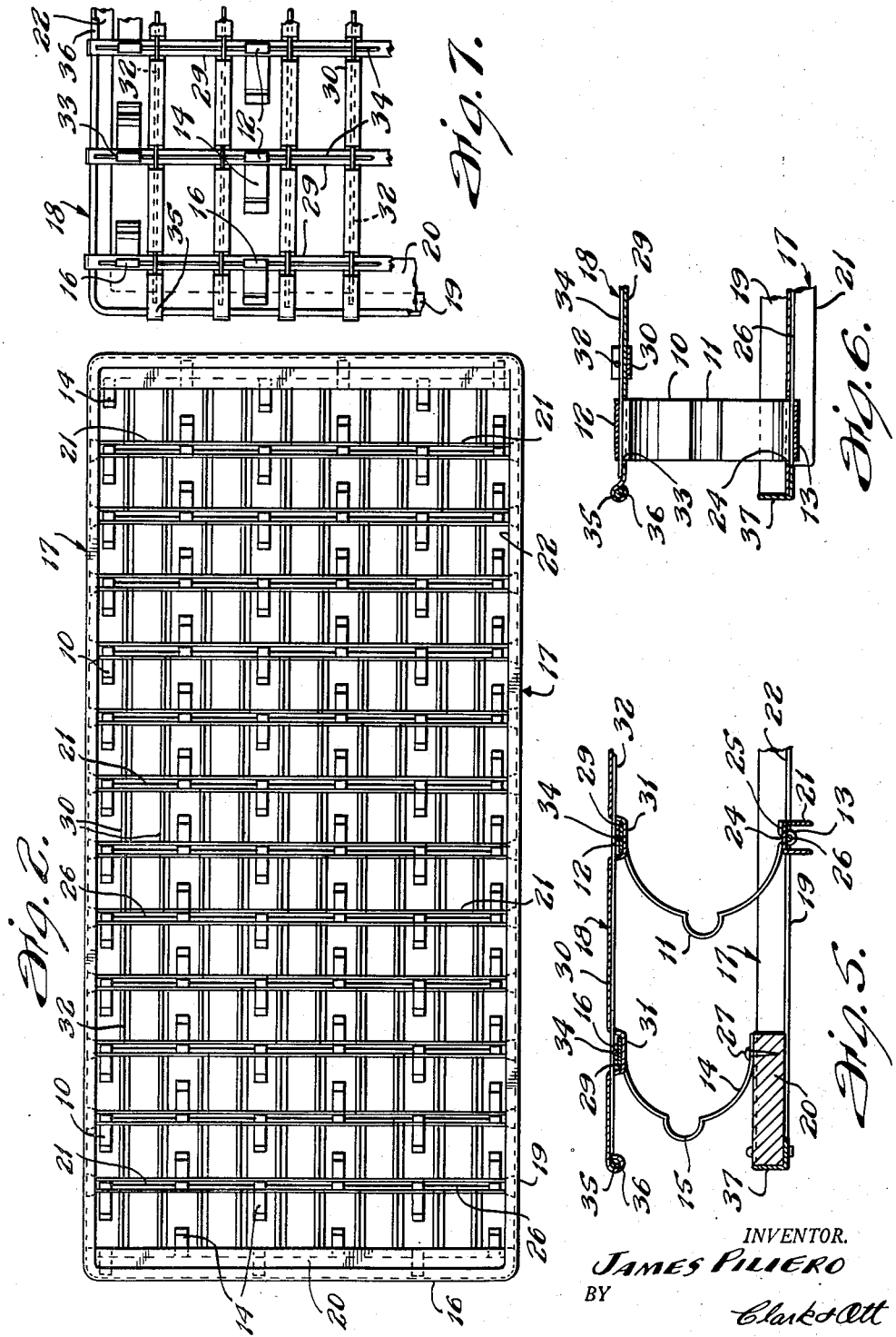
INVENTOR.
JAMES PILIERO
BY
Clark & Ott
ATTORNEYS Patented Sept. 23, 1952

2,611,138

UNITED STATES PATENT OFFICE 2,611,138

MATTRESS AND UPHOLSTERY SPRING STRUCTURE

James Piliero, Astoria, N. Y., assignor to The Englander Company, Inc., Chicago, Ill., a corporation of Delaware Application February 3, 1950, Serial No. 142,279

2 Claims. (Cl. 5—247)

This invention relates to a spring structure for use in a mattress or as a bed spring and which may also be used as an upholstery spring for seat and back cushions.

An object of the invention is to provide a spring structure composed of bowed springs arranged throughout the area thereof which afford a resilient support providing flexibility and softness while producing a strong stable construction.

Another object of the invention is to provide a spring structure of said character in which the bowed springs may be arranged within the assembly is contiguous or any desired apart relation in accordance with requirements and which bowed springs may be readily replaced without sacrificing security, durability or stability of the spring structure.

Another object of the invention is to provide a spring structure in which one end of each of the bowed springs is affixed to a resilient cross member while the opposite ends of the springs may be secured to any desired type of frame or support.

Another object of the invention is to provide a spring structure of said character in which the upper and lower ends of the bowed springs are securely affixed to frame members so as to prevent canting or loosening of the springs.

Another object of the invention is to provide a spring structure in which the springs are secured to cross members of a rigid foundation frame and at their upper ends are secured to a resilient frame consisting of crossed flexible spring strips.

Still another object of the invention is to provide a spring structure in which the springs have offset bends at the opposite ends thereof which engage through openings in the cross members and cross strips of the rigid and flexible frames and with wire members extending through eyes formed by the protruding bends for securing the springs and the rigid and flexible frames together in assembled relation.

Still another object of the invention is to provide a spring structure of the character set forth in which a border wire is connected with the ends of the cross spring strips and in which one of the strips at each intersection is depressed to receive the other strip with means extending through the depressed portions for securing the cross strips together yet permitting of relative flexing thereof at the intersections.

With the foregoing and other objects in view, reference is now made to the following specification and accompanying drawings in which the preferred embodiment of the invention is disclosed.

In the drawings:

Fig. 1 is a top plan view of a spring structure constructed in accordance with the invention.

Fig. 2 is a bottom plan view thereof.

Fig. 3 is an enlarged fragmentary sectional view taken approximately on line 3—3 of Fig. 1.

Fig. 4 is a similar view taken approximately on line 4—4 of Fig. 1.

Fig. 5 is an enlarged fragmentary sectional view taken approximately on line 5—5 of Fig. 1.

Fig. 6 is an enlarged fragmentary sectional view taken approximately on line 6—6 of Fig. 1.

Fig. 7 is an enlarged fragmentary top plan view of one corner of the spring structure.

Referring to the drawings by characters of reference, the spring structure includes longitudinally and transversely extending rows of bowed or semi-circular springs 10 which are preferably fashioned from flat spring stock and have outwardly extending U-shaped bends 11 formed intermediate the height thereof. The said springs are also formed with upwardly projecting transversely extending U-shaped bends 12 adjacent the upper ends thereof and with downwardly projecting transversely extending U-shaped bends 13 located adjacent the lower ends thereof. The spring structure also includes a row of bowed or semi-circular springs 14 at the opposite ends thereof which have outwardly projecting U-shaped bends 15 intermediate the height of said spring and with upwardly projecting transversely extending U-shaped bends 16 adjacent the upper ends thereof.

The said springs are arranged in spaced relation throughout the area of the spring structure and are disposed between rigid and resilient frames 17 and 18. The rigid frame 17 constitutes a support or foundation and includes a marginal frame 19 and spaced parallel cross bars consisting of wooden bars 20 at the ends thereof and metallic bars 21 intermediate the wooden bars. The marginal frame 19 is preferably of angle iron construction which is arranged with a flange 22 extending inwardly, while the metallic cross bars 21 are preferably of inverted U-shaped formation in cross-section with the opposite ends thereof flattened and welded or otherwise secured to the inwardly directed flange 22 at the opposite sides of the marginal frame 19. The wooden bars 20 consist of flat wooden strips which are secured at their ends to the inwardly extending flanges 22 at the opposite sides of the marginal frame 19.

The wooden and metallic cross bars correspond in number to the number of transverse rows of the bowed springs 10 and 14 and the metallic cross bars 21 are formed with longitudinally extending slots 24 in the top walls thereof which slots correspond in number to the number of longitudinal rows of said bowed springs. The bowed springs 10 are disposed with the lower ends thereof arranged upon the top walls 25 of the metallic cross bars 21 and with the downwardly projecting U-shaped bends 13 disposed in said slots 24 and protruding downwardly therethrough so as to form loops beneath the underside of the top walls. Stiff wire members 26 are provided which extend longitudinally of said cross bars beneath the top walls thereof and through the said loops for firmly securing the bowed springs 10 to the metallic cross bars 21 of the rigid frame 17. The bowed springs 14 in the transverse rows at the opposite ends of the spring structure are disposed with their lower ends arranged upon the wooden bars 20 and secured thereto by screws 27 or equivalent fastening means.

The resilient frame 18 consists of spaced transversely extending spring strips 29 which are crossed by spaced longitudinally extending spring strips 30, the transversely extending spring strips 29 being disposed in superposed relation with reference to the cross bars and corresponding in number to the number of transverse rows of said bowed springs 10 and 14. At the junctures of the longitudinally and transversely extending spring strips, the longitudinally extending spring strips 30 are depressed to form shallow rectangular U-shaped bends 31 for receiving the transversely extending strips 29 which are secured therein to connect the strips together by stiff wire members 32 extending longitudinally of the longitudinally extending strips 30 and through openings in the opposite legs of the shallow bends 31 thereof to dispose the wire members 32 above the transversely extending strips.

The resilient frame 18 is disposed with the transversely extending spring strips 29 imposed upon the upper ends of the bowed springs 10 and 14. The said strips are formed with longitudinally extending spaced slots 33 through which the upwardly projecting U-shaped bends 12 and 16 of the bowed springs 10 and 14 protrude with the protruding upper portions thereof forming loops. Stiff wire members 34 extending longitudinally of the transversely extending strips 29 engage through the said loops for securing the bowed springs to the resilient frame. The spring strips 29 and 30 are formed with rolled ends forming eyes 35 through which extends a border wire 36 continuously about the periphery of the resilient frame 18 which border wire is located in alignment with the outer vertical flange 37 of the rigid frame 17.

Constructed in this manner there is provided a spring structure which may be used in a mattress as a resilient foundation for a layer of soft material disposed upon the flexible frame or which may be used as a bed spring to support a mattress and which may also be used as an upholstery spring for seat and back cushions. The flexible frame being of a resilient character will depress with the flexing of the springs so as to provide a comfortable support and the parts of the spring structure being connected together by wire members extending longitudinally of the supporting bars and strips retain the springs against lateral flexing or canting.

While stiff wire members 26 and 34 have been shown and described, the same may consist of a flexible cable extending longitudinally of the cross bars 21 and cross straps 29 and through the loops formed by the protruding portions of the U-shaped bends 13 and 12 for securing the springs 14 to the upper and lower frame structures, or the same may be secured by individual staples or clips extending through each of the said loops, or any equivalent fastening means.

What is claimed is:

1. In a spring structure, a rigid frame including a rigid border member extending peripherally about the frame and cross-bars connected at their ends to the opposite sides of said border member, a flexible frame consisting of longitudinally and transversely extending crossed flexible metallic strips, means connecting said strips for relative sliding movement, semi-circular spring members disposed between said rigid and flexible frames, said cross-bars and said transversely extending flexible strips having slots opening therethrough and said spring members having U-shaped bends arranged to protrude through said slots, and wire members extending longitudinally of said cross-bars and of said transversely extending strips and through the loops of the protruding bends for securing the springs to said frames.

2. In a spring structure, a rigid frame including a rigid border member extending peripherally about the frame and cross-bars connected at their ends to the opposite sides of said border member, a flexible frame consisting of longitudinally and transversely extending crossed flexible metallic strips, means connecting said strips for relative sliding movement, semi-circular spring members disposed between said rigid and flexible frames, said cross-bars and said transversely extending flexible strips having slots opening therethrough and said spring members having U-shaped bends arranged to protrude through said slots, wire members extending longitudinally of said cross-bars and of said transversely extending strips and through the loops of the protruding bends for securing the springs to said frames, and a wire member extending peripherally about said flexible frame and secured to the ends of said longitudinally and transversely extending strips.

JAMES PILIERO.

REFERENCES CITED

The following references are of record in the file of this patent:

UNITED STATES PATENTS

| Number | Name | Date |
|---|---|---|
| 103,030 | Duffy et al. | May 17, 1870 |
| 754,260 | Venable | Mar. 8, 1904 |
| 771,191 | Venable | Sept. 27, 1904 |
| 1,120,887 | Barber | Dec. 15, 1914 |
| 1,329,145 | Seelig | Jan. 27, 1920 |
| 1,888,357 | Oldman | Nov. 22, 1932 |
| 2,242,731 | Tallmadge | May 20, 1941 |